United States Patent
Saito et al.

(10) Patent No.: US 7,642,503 B2
(45) Date of Patent: Jan. 5, 2010

(54) METHOD TO DETERMINE A CONTROL PARAMETER IN A MEASUREMENT CONTROL SYSTEM

(75) Inventors: Akinori Saito, Veenendaal (NL); Kazuhiko Hidaka, Veenendaal (NL)

(73) Assignee: Mitutoyo Corporation, Kawasaki-shi (JP)

( * ) Notice: Subject to any disclaimer, the term of this patent is extended or adjusted under 35 U.S.C. 154(b) by 722 days.

(21) Appl. No.: 11/226,129

(22) Filed: Sep. 14, 2005

(65) Prior Publication Data

US 2006/0056548 A1 Mar. 16, 2006

(30) Foreign Application Priority Data

Sep. 15, 2004 (JP) ............................. 2004-268752
Sep. 15, 2004 (JP) ............................. 2004-268753

(51) Int. Cl.
*G06M 7/00* (2006.01)
(52) U.S. Cl. ..................................................... 250/221
(58) Field of Classification Search ................ 250/221, 250/214 AG, 214 C, 214 DC
See application file for complete search history.

(56) References Cited

U.S. PATENT DOCUMENTS

2004/0125079 A1* 7/2004 Kaneko et al. .............. 345/156

FOREIGN PATENT DOCUMENTS

| JP | 1-102902 | 7/1989 |
|----|----------|--------|
| JP | 05-223519 | 8/1993 |
| JP | 06-281445 | 10/1994 |
| JP | 11-133038 | 5/1999 |

* cited by examiner

*Primary Examiner*—Thanh X Luu
*Assistant Examiner*—Francis M Legasse, Jr.
(74) *Attorney, Agent, or Firm*—Rankin, Hill & Clark LLP (57) ABSTRACT

N pieces of gains $G_i$ are sequentially and temporarily set in a control circuit (23), and a stylus (131) is brought in contact with a workpiece (W) for conducting a temporary measurement. At this time, a sensor detection signal output from a sensor detection circuit (21) is filtered by a filter (31) to take out only a frequency component corresponding to a frequency of hunting generated in a closed loop (L) including the control circuit (23). Gains $G_j$ that do not generate hunting in the closed loop (L) are extracted, and the largest gain $G_j$ is set in the control circuit (23) in view of enhancement in responsivity etc. of the measurement. Alternatively, by pressing the stylus (131) into the workpiece (W), a displacement signal indicating a pressing amount and a sensor signal output from a sensor (13) are measured in accordance with a measurement load applied to the stylus (131) to calculate a gain $G_s'$ of the sensor (13) based on the two signals. By compensating the gain of the control circuit in accordance with the gain $G_s'$, frequency characteristics of the measurement control system can be kept to the largest even when the stylus (131) or the workpiece (W) is replaced with another one having different properties.

10 Claims, 6 Drawing Sheets

METHOD TO DETERMINE A CONTROL PARAMETER IN A MEASUREMENT CONTROL SYSTEM

BACKGROUND OF THE INVENTION

1. Field of the Invention

The present invention relates to a control parameter setting method for a control circuit in a measurement control system and a measuring instrument.

2. Description of Related Art

A gain, phase compensation frequency, etc. are known as a control parameter of a control circuit. As a gain setting method for the control circuit in the measurement control system, there has been conventionally known a method including a data obtaining step for obtaining data required for gain setting, a determination step for determining an optimal gain for measurement based on the data, and a setting step for setting a gain determined to be the optimal gain in the control circuit (see, for instance, Document 1: JP-A-5-223519). Herein, the optimal gain of the control circuit is a gain capable of preventing the measurement control system from being in a self-oscillation state to achieve stable measurement as well as providing quick measurement.

For determination of the optimal gain, various methods can be used. For instance, methods (a) and (b) described below are disclosed in Document 1.

(a) A data group (material of a stylus, material of a workpiece, etc) required for the gain setting is manually input by an operator, which is then compared with a data table having been prepared in advance. A plurality of reference input data groups, reference gain values (proportional action parameter PP, etc.) obtained empirically as optimal gains respectively for the reference input data groups and the like are included in the data table. The operator compares an actual input data group input by oneself and the plurality of reference input data groups and selects a reference input data group most approximate to the actual input data group to set a reference gain corresponding to the selected reference input data group in the control circuit as the optimal gain.

(b) A stylus is fixed on a point of a workpiece and a temporary measurement is conducted while changing gains (proportional action parameter PP, etc.) of the control circuit to calculate a current error $\Delta E$ for each of the gains. $\Delta E$ represents a degree of dispersion of tunneling current applied between the stylus and the workpiece relative to a target current. In a measurement control state, since the tunneling current is changed in a manner oscillating around the target current, a large $\Delta E$ indicates that amplitude around the target current is large and the measurement control system is in a self-oscillation state (i.e., hunting is being generated), while a small $\Delta E$ indicates that amplitude around the target current is small and the tunneling current is substantially equalized with the target current, so that the measuring control system is stable. A determination of the optimal gain of the control circuit is performed for stabilizing the measurement control system, and a gain realizing small $\Delta E$ is determined to be the optimal gain. Specifically, a $\Delta E$ value for each of the gains is compared with a predetermined reference value, and a gain with the $\Delta E$ value equal to or smaller than the reference value is determined to be the optimal gain.

However, the methods (a) and (b) described above each have problems as follows.

In the method (a), since a preparatory measurement for preparing the data table has to be conducted precisely, a burden on the operator is increased. In addition, since the reference gain corresponding to the reference input data that is most approximate to the actual input data group is set as the optimal gain, the optimal gain is also a mere approximate value. Thus, in ultraprecision measuring or the like, where high precision is required in setting the gain, the method cannot be employed.

In the method (b), the optimal gain of the control circuit is determined with the $\Delta E$ value as an index to prevent the hunting from being generated in the measurement control system. However, the $\Delta E$ value is mere a value indicating the degree of dispersion of the tunneling current, which cannot be directly related with existence of the hunting. Thus, the small $\Delta E$ value does not always indicate that the hunting is not generated, so that the hunting might not be prevented sufficiently even by setting the optimal gain with the method (b).

Further, frequency characteristics of the entire measurement control system are changed depending on properties such as hardness and elasticity of the measuring unit and the workpiece.

Thus, even if the frequency characteristics of the measurement control system are maximized by setting the optimal gain in the control circuit by the gain setting method disclosed in Document 1 described above, when at least one of the measuring unit and the workpiece is replaced with another one having different properties, the frequency characteristics of the measurement control system are degraded and decreased, thereby possibly impeding stability of the measurement.

SUMMARY OF THE INVENTION

An object of the present invention is to provide: a control parameter setting method for a control circuit in a measurement control system, which is capable of highly precisely setting a control parameter that can appropriately prevents generation of hunting in the measurement control system as well as capable of providing stable and quick measurement; and a measuring instrument.

A control parameter setting method according to an aspect of the present invention for a control circuit in a measurement control system that includes a measuring unit used in measurement of a workpiece and outputting a measurement signal, a control circuit for outputting a control signal based on a deviation of an output value of the measurement signal from a predetermined target value; a controller for controlling the measuring unit based on the control signal so that the output value of the measurement signal is equalized with the target value includes: a temporary measurement data obtaining step for conducting a temporary measurement by sequentially and temporarily setting a control parameter of the control circuit to N pieces of different control parameters $Q_i$ (i=1, 2, ..., N) to obtain temporary measurement data $S_i$ based on the measurement signal output during the temporary measurement over a predetermined time; an extraction step for performing frequency analysis for each of the obtained temporary measurement data $S_i$ to extract temporary measurement data $S_i$ in which a magnitude of a frequency component corresponding to a predetermined oscillation frequency in the measurement control system is smaller than a predetermined reference value; and a control parameter setting step for setting a control parameter $Q_i$ having the largest frequency characteristics in the control parameters $Q_i$ respectively corresponding to the extracted temporary measurement data $S_i$ as the control parameter of the control circuit.

In the measurement control system of the present invention, a closed loop is constituted by the measuring unit, the control circuit and the controller, and a measurement condition is controlled by a feedback control. The control parameter of the control circuit is changeable, which can adjust the control parameter of the entire closed loop.

A control parameter setting of the control circuit will be described below.

[Temporary Measurement Data Obtaining Step]

First, N pieces of control parameters $Q_1$ to $Q_N$ of the control circuit are sequentially and temporarily set to obtain a temporary measurement data $S_i$ for each of the control parameters $Q_i$. The temporary measurement data $S_i$ is obtained by recording a predetermined measurement amount $f_i$ based on the measurement signal from the measuring unit for each unit of time t, which is constituted by a plurality of groups of $(f_i, t)$. A function $f_i(t)$ regarding the measurement time t is established by plotting the temporary measurement data $S_i$ on a coordinate plane and smoothly connecting each of plotted points. Incidentally, if the measurement amount $f_i$ is continuously recorded for a predetermined time in the temporary measurement, the $f_i$ itself can establish the function $f_i(t)$.

Since a feedback control is performed so that the output value of the measurement signal from the measuring unit is equalized with the target value even in the temporary measurement, the value of the function $f_i(t)$ based on the measurement signal generally changes over time while oscillating around a target position corresponding to the target value. Herein, when the measurement control system (closed loop) is stable without generation of the hunting, the amplitude of $f_i(t)$ around the target position attenuates as the time t elapses, $f_i(t)$ coming close to the target position. On the other hand, when the measurement control system is unstable with generation of the hunting, the amplitude of $f_i(t)$ around the target position does not attenuate as the time t elapses, so that $f_i(t)$ continues to oscillate while keeping a predetermined or larger amplitude.

Figure 1A:
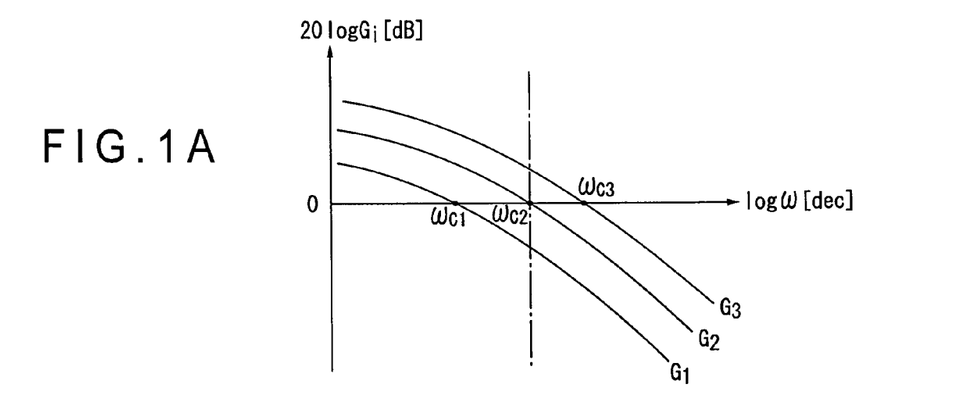
FIGS. 1A to 1C are Bode diagrams each showing frequency transfer function of a control circuit according to the present invention.
Figure 1B:
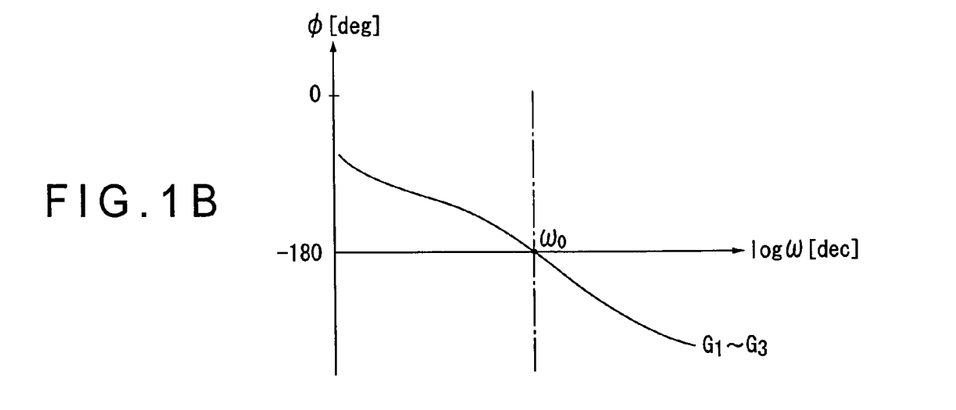
Figure 1C:
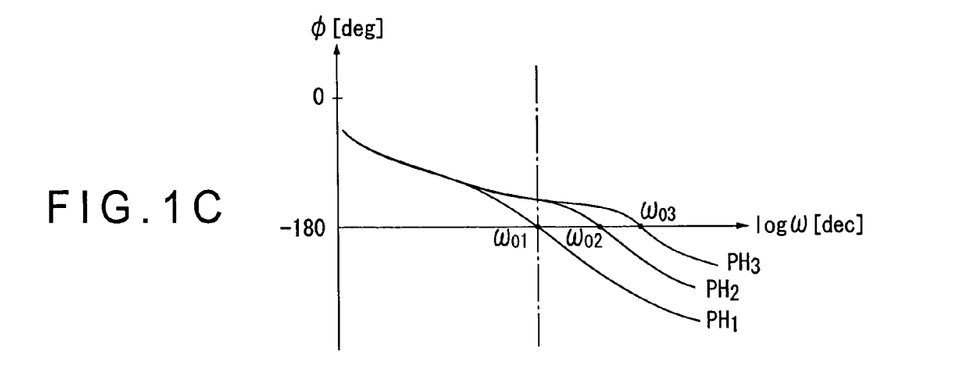

Now, relationship between the hunting in the measurement control system and the control parameter of the measurement control system will be described. According to the present invention, the control parameter of the control circuit is changeable. In the following description, a gain will be described as an example of the control parameter. The gain of the measurement control system is uniquely determined by the gain of the control circuit. Note that the gain in the following description is a gain of the control circuit. FIGS. 1A to 1C each show Bode diagram of a frequency transfer function of the control circuit. FIG. 1A is a gain diagram, while FIG. 1B is a phase diagram.

Now, FIG. 1A shows respective gain characteristics when different gains $G_1$, $G_2$ and $G_3$ ($G_1 < G_2 < G_3$) are set in the control circuit. In the following description, change of the gains is mainly considered, and change of the phase is not taken into consideration. Thus, the phase diagram in FIG. 1B does not change. In other words, a single phase line in FIG. 1B is a common phase line for the three gains $G_1$ to $G_3$. In FIG. 1A, although gain lines respectively corresponding to the gains $G_1$ to $G_3$ are shown in parallel for simplifying the description, actual gains can be changed with different change rate for each frequency, thus allowing flexible setting.

For determination of stability of the measurement control system, namely, for determination of whether the hunting is to be generated or not, a gain crossover frequency $\omega_c$ with a gain value being one (0 in the gain diagram) and a phase crossover frequency $\omega_0$ with a phase $\phi$ being $-180°$ are used, as it is known in general.

When the gain is $G_1$, a relation of $\omega_{c1} < \omega_0$ is established as shown in FIG. 1A. Thus, when the phase is $-180°$ or smaller, the gain is always one or smaller (indicating minus in the gain diagram), so that the hunting is not generated and the measurement control system is stable.

When the gain is increased from $G_1$ to $G_2$, a relation of $\omega_{c1} = \omega_0$ is established. This state is a stability limit, and thus if the gain is further increased, the hunting is generated immediately.

The gain diagram of the gain $G_3$ shows a state where the hunting is generated. At this time, a relation of $\omega_{c3} > \omega_0$ is established. In a frequency zone of $\omega_0 = \omega = \omega_{c3}$, the phase is $-180°$ or smaller and the gain is one or larger (indicating plus in the gain diagram). Thus, the hunting with the frequency that belongs to this frequency zone (hereinafter referred to as self-oscillation frequency zone) is generated, which causes the measurement control system to be unstable.

From the description above, it is understood that a hunting frequency of the measurement control system is the frequency that belongs to the self-oscillation frequency zone of $\omega_0 = \omega = \omega_{c3}$. Since a lower limit $\omega_0$ is unchangeable, the self-oscillation frequency zone is uniquely determined by setting the gain $G_3$ ($> G_2$) to define an upper limit $\omega_{c3}$. The oscillation frequency of the present invention generally means the frequency that belongs to the self-oscillation frequency zone.

Next, an arrangement where the control circuit includes a phase compensation circuit and characteristics of the phase diagram are changeable will be described.

FIG. 1C shows an example in which the phase compensation circuit is a phase lead compensation circuit, and the phase crossover frequency is changeable due to the phase lead compensation as shown by $\omega_{01}$ (phase characteristics $PH_1$), $\omega_{02}$ (phase characteristics $PH_2$) and $\omega_{03}$ (phase characteristics $PH_3$). In this case, the principle of generation of the hunting is also the same, and in a relationship between the gain crossover frequency $\omega_c$ and the phase crossover frequency $\omega_0$, $\omega_c = \omega_0$ is a stable condition. Combinations of the gain characteristics and the phase characteristics may be changeable so as to be independent of each other, or may be changeable while keeping the correlation. For instance, the gain characteristics and the phase characteristics may have a relationship of control parameters $Q_1$ ($G_1$, $PH_1$), $Q_2$ ($G_2$, $PH_2$), $Q_3$ ($G_3$, $PH_3$), $Q_4$ ($G_4$, $PH_4$) . . . , or control parameters $Q_1$ ($G_1$, $PH_1$), $Q_2$ ($G_1$, $PH_2$), $Q_3$ ($G_2$, $PH_1$), $Q_4$ ($G_2$, $PH_2$) . . . . In either case, a control parameter satisfying the stable condition as well as having the largest gain crossover frequency $\omega_c$ provides the largest frequency characteristics of the measurement control system. Incidentally, although $\omega_c = \omega_0$ is indicated as the stable condition, the phase delay is preferably around $-150°$ in $\omega_c = 0$ in a practical use where stability should be considered. Although the phase compensation circuit is the phase lead compensation circuit in the description, a phase delay compensation circuit may also be employed. Further, when the phase lead compensation circuit and the phase delay compensation circuit are used in combination, the principal is the same. Although an arrangement where the phase compensation circuit is included in the control circuit is exemplified, the phase compensation circuit may be inserted in a feedback circuit of a sensor detection signal.

As another example of the oscillation frequency in the measurement control system, resonance frequency $\omega_r$ of an electric circuit included in the measurement control system can be exemplified. When a measurement signal including a resonance frequency component of $\omega_r$ with a predetermined value or more is input to the electric circuit, the resonance frequency component hardly attenuates, so that the measurement signal keeps oscillating with the resonance frequency $\omega_r$. Particularly, when the gain of the measurement control system in the resonance frequency $\omega_r$ is one or larger, since the resonance frequency component is amplified to cause the amplitude to be increased, the measurement control system becomes unstable. This is totally the same condition as in the self-oscillation frequency zone described above. That is to say, even when the measurement signal comes close to the target value under control of the measurement control system, oscillation of $\omega_r$ remains, so that the measurement signal keeps oscillating around the target value.

[Extraction Step]

Subsequent to the temporary measurement data obtaining step described above, the extraction step is performed. In the extraction step, frequency analysis is conducted for each of the temporary measurement data $S_i$. Specifically, the function $f_i(t)$ in each of the temporary measurement data $S_i$ is Fourier-transformed and indicated as frequency readout to compare magnitude of the frequency component corresponding to the oscillation frequency with a predetermined reference value Since the oscillation frequency is frequency generating the hunting, when the frequency component corresponding to the oscillation frequency is large, the hunting is generated, while, when the frequency component is small, the generation of hunting is appropriately prevented. The reference value is preset as an optimal value for determining generation of the hunting. Note that the reference value may be set as an independent value for each oscillation frequency in the self-oscillation frequency zone.

According to the frequency analysis described above, M (=N) pieces of temporary measurement data $S_j$ (j=1, 2, . . . , M), the oscillation frequency components of which are smaller than the reference value, are extracted.

[Control Parameter Setting Step]

The extracted temporary measurement data $S_j$ is a data group that ensures the stable condition of the measurement control system without generation of the hunting. Thus, by setting the control parameters $Q_j$ corresponding to these $S_j$ in the control circuit, stability of the measurement control system can be secured.

Once the stability can be secured, what is required is, for instance, to set the gain to as large value as possible for enhancing steady state and quick response (responsivity). In the control parameter setting step, in each of the control parameters $Q_j$ ensuring the stability of the measurement control system, a control parameter having the largest frequency characteristics is set as the control parameter of the control circuit.

As described above, since the control parameter setting method for the present invention allows the control parameter capable of achieving high steady state and quick response to be set in the control circuit while securing the stability of the measurement control system, the measurement can be conducted stably, highly precisely and quickly.

Further, while an amount such as the current error $\Delta E$ indirectly related to generation of the hunting is employed in the method (b) of the above-described Document 1, the magnitude of the oscillation frequency component of the measurement signal directly related to generation of the hunting is employed in the present invention for setting the optimal control parameter, thus directly and appropriately preventing the generation of the hunting as well as achieving high stability.

As described above, according to the present invention, it is preferable that the control parameter of the control circuit is at least one of a gain or a phase compensation frequency.

According to the present invention, in the temporary measurement data obtaining step for the control parameters $Q_i$, the temporary measurement data $S_i$ is preferably obtained by filtering the measurement signal by a frequency filter that allows only a frequency component corresponding to the oscillation frequency to pass through.

With the arrangement, the function $f_i(t)$ for each of the Si only includes the oscillation frequency component filtered by the frequency filter. Since $f_i(t)$ does not have to be Fourier-transformed, the optimal gain for stabilizing the measurement control system can be set even more quickly and easily.

According to the present invention, it is preferable to perform: a storage step for stores a control parameter Q of the entire measurement control system determined by the control parameter $Q_i$ set in the control circuit in the control parameter setting step; and a control parameter compensation step for compensating the control parameter of the control circuit so as to counterbalance an apparent change of a control parameter of the measuring unit, the apparent change generated by replacing at least one of the measuring unit and the workpiece with another one having different properties, to keep the control parameter of the entire measurement control system to the stored control parameter Q.

The measurement signal output from the measuring unit is changed depending on properties such as hardness and elasticity of the measuring unit and the workpiece. Thus, when at least one of the measuring unit and the workpiece is replaced with another one having different properties, the control parameter of the measuring unit is apparently changed. Consequently, the control parameter of the entire measurement control system is deviated from the optimal control parameter Q set in the control parameter setting step of the control circuit, which might impede the stability of the measurement.

According to the present invention, first, the optimal control parameter Q of the entire measurement control system is stored in the storage step. Then, when the control parameter of the measuring unit is apparently changed due to replacement of at least one of the measuring unit and the workpiece, the control parameter compensation step is performed to compensate the control parameter of the control circuit, so that the control parameter of the entire measurement control system is kept to the stored optimal control parameter Q. Therefore, according to the present invention, the control parameter of the entire measurement control system is kept to the optimal control parameter regardless of types of the measuring unit and the workpiece, so that the measurement can be conducted stably and highly precisely.

According to the present invention, it is preferable that the measuring unit is a probe that is brought in contact with the workpiece for measurement, and the control parameter compensation step includes: a preparatory measurement step for conducting contact measurement by pressing the probe into the workpiece by a predetermined pressing amount after replacing at least one of the probe and the workpiece and measuring the pressing amount; a calculation step for calculating the apparent change in the control parameter of the probe based on a relationship between the output value of the measurement signal and the measured pressing amount in the preparatory measurement step; and a compensation step for compensating the control parameter of the control circuit so that the control parameter of the entire measurement control system is kept to the control parameter Q based on a calculation result in the calculation step.

According to the present invention, since a measurement load or the like applied to the probe differs depending on properties such as hardness and elasticity of the probe and the workpiece, when at least one of the probe and the workpiece is replaced with another one having different properties, the output value of the measurement signal output from the probe is changed, which generates an apparent change in the control parameter of the probe.

In the preparatory measurement step of the present invention, contact measurement is conducted by pressing the probe into the workpiece by a predetermined amount, and the output value of the measurement signal and the pressing amount at this time are sensed. In the subsequent calculation step, the apparent change in the control parameter of the probe is calculated using correlation between the output value of the measurement signal and the pressing amount. In the last control parameter compensation step, the control parameter of the control circuit is compensated by counterbalancing the apparent change in the control parameter of the probe so that the control parameter of the entire measurement control system is kept to the optimal control parameter Q.

As described above, in the present invention, since the control parameter of the entire measurement control system is kept to the optimal control parameter Q regardless of types of the probe and the workpiece, the measurement can be conducted stably and precisely.

According to the present invention, a measuring instrument can be constituted with the measuring control system that includes the control circuit in which the control parameter is set by the control parameter setting method for the control circuit.

The measuring instrument allows the measurement to be conducted stably, highly precisely and quickly.

Another object of the present invention is to provide: a control parameter setting method for a control circuit in a measurement control system, which is capable of keeping the largest frequency characteristics of the measurement control system by appropriately compensating the control parameter of the control circuit; and a measuring instrument.

A control parameter setting method according to another aspect of the present invention for a control circuit in a measurement control system that includes a measuring unit used in measurement of a workpiece and outputting a measurement signal, a control circuit for outputting a control signal based on a deviation of an output value of the measurement signal from a predetermined target value, a controller for controlling the measuring unit based on the control signal so that the output value of the measurement signal is equalized with the target value includes: a storage step for stores a control parameter Q providing the largest frequency characteristics in the measurement control system; a control parameter compensation step for compensating the control parameter of the control circuit so as to counterbalance an apparent change of a control parameter of the measuring unit, the apparent change generated by replacing at least one of the measuring unit and the workpiece with another one having different properties, to keep the control parameter of the entire measurement control system to the stored control parameter Q.

In the measurement control system of the present invention, a closed loop is constituted by the measuring unit, the control circuit and the controller, and a measurement condition is controlled by a feedback control. The control parameter of the control circuit is changeable, which can adjust the control parameter of the entire closed loop.

According to the present invention, first, the control parameter Q providing the largest frequency characteristics in the measurement control system is stored in the storage step. Then, when the control parameter of the measuring unit is apparently changed due to replacement of at least one of the measuring unit and the workpiece, the control parameter compensation step is performed to compensate the control parameter of the control circuit, so that the control parameter of the entire measurement control system is kept to the stored optimal control parameter Q. Therefore, according to the present invention, the control parameter of the entire measurement control system is kept to the optimal control parameter regardless of types of the measuring unit and the workpiece, so that the measurement can be conducted stably and highly precisely.

According to the present invention, it is preferable that the measuring unit is a probe that is brought in contact with the workpiece for measurement, and the control parameter compensation step includes: a preparatory measurement step for conducting contact measurement by pressing the probe into the workpiece by a predetermined pressing amount after replacing at least one of the probe and the workpiece and measuring the pressing amount; a calculation step for calculating the apparent change in the control parameter of the probe based on a relationship between the output value of the measurement signal and the measured pressing amount in the preparatory measurement step; and a compensation step for compensating the control parameter of the control circuit so that the control parameter of the entire measurement control system is kept to the control parameter Q based on a calculation result in the calculation step.

According to the present invention, since a measurement load or the like applied to the probe differs depending on properties such as hardness and elasticity of the probe and the workpiece, when at least one of the probe and the workpiece is replaced with another one having different properties, the output value of the measurement signal output from the probe is changed, which generates an apparent change in the control parameter of the probe.

In the preparatory measurement step of the present invention, contact measurement is conducted by pressing the probe into the workpiece by a predetermined amount, and the output value of the measurement signal and the pressing amount at this time are detected. In the subsequent calculation step, the apparent change in the control parameter of the probe is calculated using correlation between the output value of the measurement signal and the pressing amount. In the last control parameter compensation step, the control parameter of the control circuit is compensated by counterbalancing the apparent change in the control parameter of the probe so that the control parameter of the entire measurement control system is kept to the optimal control parameter Q.

As described above, in the present invention, since the control parameter of the entire measurement control system is kept to the optimal control parameter Q regardless of types of the probe and the workpiece, and the measurement can be conducted stably and precisely.

According to the present invention, it is preferable to perform: a temporary measurement data obtaining step for conducting a temporary measurement by sequentially and temporarily setting a control parameter of the control circuit to N pieces of different control parameters $Q_i$ (i=1, 2, ..., N) to obtain temporary measurement data $S_i$ based on the measurement signal output during the temporary measurement over a predetermined time; an extraction step for performing frequency analysis for each of the obtained temporary measurement data $S_i$ to extract temporary measurement data $S_j$ in which a magnitude of a frequency component corresponding to a predetermined oscillation frequency in the measurement control system is smaller than a predetermined reference value; and a control parameter setting step for setting a control parameter $Q_j$ having the largest frequency characteristics in the control parameters $Q_j$ respectively corresponding to the extracted temporary measurement data $S_j$ as the control parameter of the control circuit, in which a control parameter Q of the entire measurement control system determined by the control parameter $Q_j$ set in the control circuit in the control parameter setting step is stored in the storage step.

The temporary measurement data obtaining step, the extraction step and the control parameter setting step in the present invention are a series of steps performed for setting the control parameter Q that provides the largest frequency characteristics in the measurement control system and is stored in the storage step.

Incidentally, since these steps have been already described in [Preparatory Measurement Data Obtaining Step], [Extraction Step] and [Control Parameter Setting Step], the description thereof is omitted herein.

As described above, with the series of steps including the temporary measurement data obtaining step, the extraction step and the control parameter setting step, the control parameter capable of achieving high steady state and quick response can be set in the control circuit while securing stability of the measurement control system, so that the control parameter Q providing the largest frequency characteristics in the measurement control system can be determined. Since the control parameter Q is stored in the storage step, and the control parameter of the measurement control system is kept to the Q by the control parameter compensation step, the measurement can be constantly conducted stably, highly precisely and quickly.

According to the present invention, in the temporary measurement data obtaining step for the control parameters $Q_i$, the temporary measurement data $S_i$ is preferably obtained by filtering the measurement signal by a frequency filter that allows only a frequency component corresponding to the oscillation frequency to pass through.

With the arrangement, the function $f_i(t)$ for each of the $S_i$ only includes the oscillation frequency component filtered by the frequency filter. Since $f_i(t)$ does not have to be Fourier-transformed, the optimal gain for stabilizing the measurement control system can be set even more quickly and easily.

As described above, according to the present invention, it is preferable that the control parameter of the control circuit is at least one of a gain or a phase compensation frequency.

According to the present invention, a measuring instrument can be constituted with the measuring control system that includes the control circuit in which the control parameter is compensated by the control parameter setting method for the control circuit.

With the measuring instrument, the control parameter of the entire measurement control system is kept to the optimal control parameter regardless of types of the measuring unit and the workpiece, so that the measurement can be conducted stably and highly-precisely.

DETAILED DESCRIPTION OF PREFERRED EMBODIMENT(S)

An embodiment of the present invention will be described with reference to the attached drawings.

Figure 2:
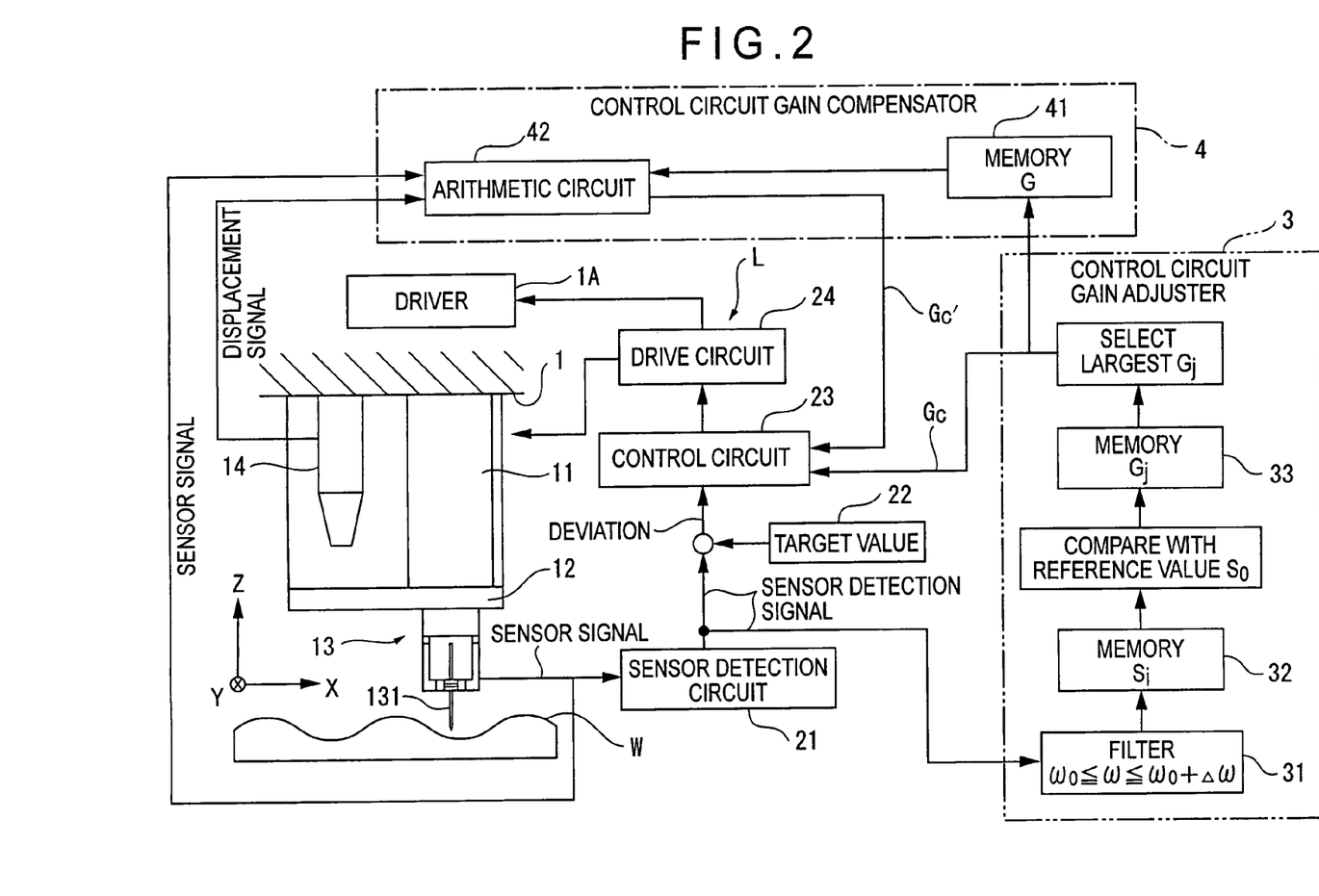
FIG. 2 is an illustration showing a measuring instrument according to an embodiment of the present invention.
Figure 3:
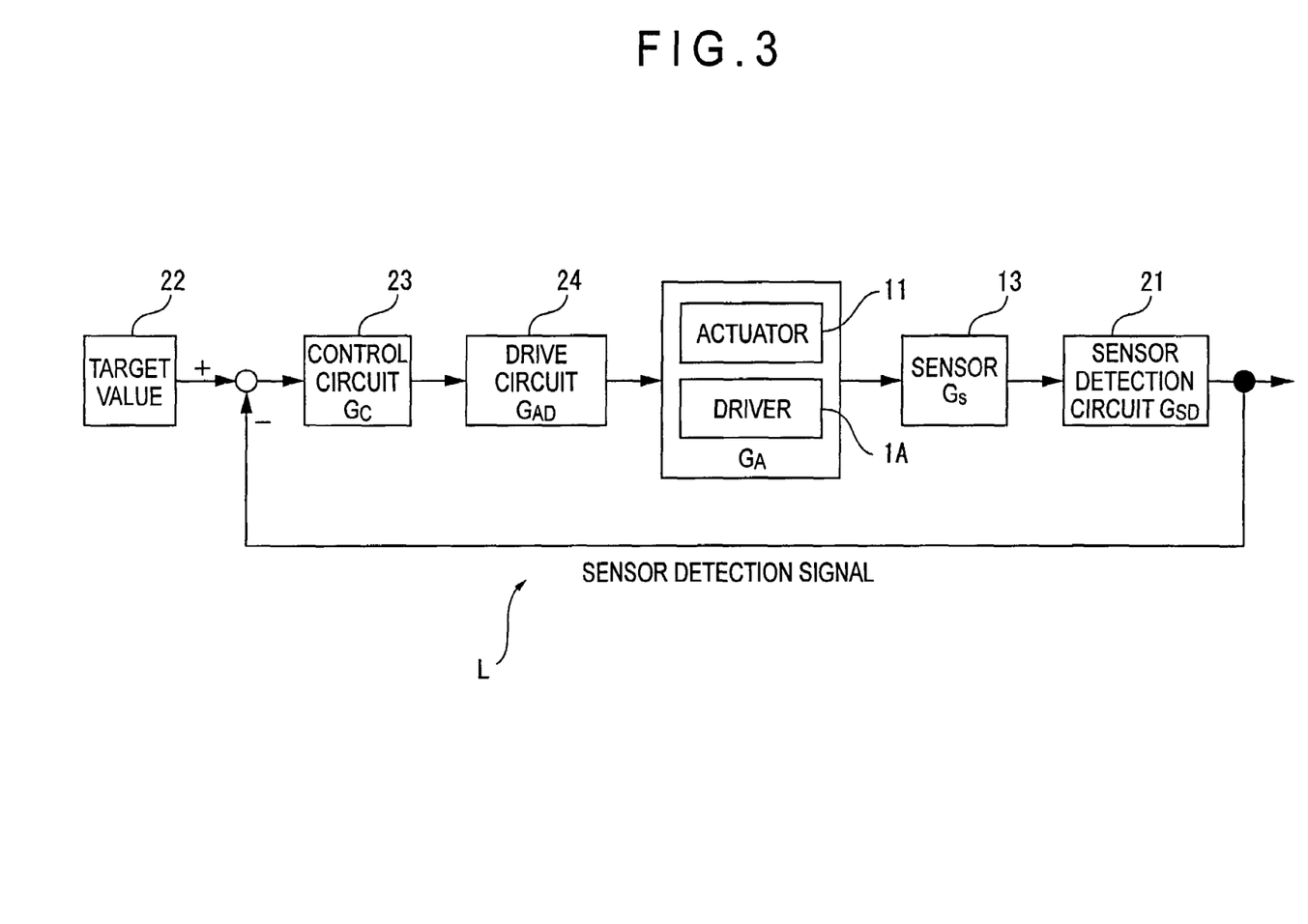
FIG. 3 is a block diagram showing a closed loop performing a feedback control in the measuring instrument of the embodiment.

FIG. 2 shows a measuring instrument of the present embodiment, while FIG. 3 shows a block diagram schematically showing how a feedback control is performed in the measuring instrument.

In FIG. 2, a sensor support 12 is attached to a body 1 of the measuring instrument via an actuator 11, and a sensor 13 (measuring unit) for conducting measurement of a workpiece W is attached to the sensor support 12.

The body 1 can be moved by a driver 1A in three-dimensional directions relative to the workpiece W. The measurement can be conducted by moving the sensor 13 along a surface of the workpiece W. A displacement sensor 14 attached to the body 1 is a sensor for sensing a vertical distance (in Z-axis direction) between the body 1 and the workpiece W upon relative movement thereof by a non-contact method such as optical and electrostatic capacitance methods.

The actuator 11 (controller) is a motion controller that is extensible/contractible based on a drive signal from a drive circuit 24 (described later), the actuator 11 moving the sensor 13 close to/away from the workpiece W in Z-axis direction to perform a minute positioning control.

That is to say, the sensor 13 positioned by moving the body 1 is further positioned minutely by the actuator 11, thereby enhancing precision of the measurement.

The sensor 13 (probe) includes a stylus 131 constantly oscillated in an axial direction. When the stylus 131 contacts with the workpiece W, amplitude of the stylus 131 attenuates in accordance with a contact load. A sensor signal (measurement signal) is output from the sensor 13 in accordance with change amount of the amplitude of the stylus 131, and the measurement condition is controlled based on the sensor signal. Incidentally, it is assumed that the amplitude of the stylus 131 and the output value of the sensor signal are linearly changed relative to a measurement load applied to the stylus 131.

The sensor signal from the sensor 13 is processed in a sensor detection circuit 21 to be output as a sensor detection signal. The sensor detection signal is also included in the measurement signal of the present invention. The sensor detection signal is divided, one of which is input to the closed loop L as a feedback signal for performing the feedback control as shown in FIG. 3, while the other of which is input to a control circuit gain adjuster 3 for adjusting a gain (control parameter Q) of a control circuit 23 (described later).

The sensor detection signal that is input to the closed loop L as the measurement signal is compared with its target value 22, deviation between the both being input to the control circuit 23. The control circuit 23 amplifies the deviation based on a gain Gc (described later) having been adjusted in the control circuit gain adjuster 3 and inputs the deviation to the drive circuit 24 as a control signal. The drive circuit 24 outputs a drive control signal based on the input control signal to at least one of the actuator 11 and the driver 1A, and accordingly the actuator 11 is extended/contracted or the body 1 is moved in Z-axis direction. Then, the sensor 13 is displaced in Z-axis direction relative to the workpiece W and measurement load between the sensor 13 and the workpiece W is changed, so that the sensor signal from the sensor 13 is changed. As described above, the actuator 11 and the driver 1A form the controller of the present invention, which controls the sensor 13 based on the drive control signal.

As described above, the closed loop L for controlling the measurement condition includes, in sequence, the sensor 13, the sensor detection circuit 21, the control circuit 23, the drive circuit 24, the actuator 11, the driver 1A and the sensor 13, where the measurement is conducted under the feedback control in which the sensor detection signal from the sensor detection circuit 21 is equalized with the target value 22.

Next, a measurement method using the measuring instrument of the present embodiment will be described below.

The body 1 is moved in −Z-axis direction (downward in FIG. 2) by the driver 1A to press the stylus 131 of the sensor 13 into the workpiece W by a predetermined pressing amount, and then the body 1 is stopped. In the subsequent steps, the movement of the body 1 in Z-axis direction is restricted and vertical distance (in Z-axis direction) between the body 1 and the workpiece W is kept to constant.

When the stylus 131 is pressed into the workpiece W, the amplitude (in Z-axis direction) of the stylus 131 is changed in accordance with the measurement load. For instance, since larger pressing amount causes larger measurement load to be applied to the stylus 131, the amplitude of the stylus 131 attenuates.

Information regarding the amplitude of the stylus 131 is output from the sensor 13 as the sensor signal, and then processed in the sensor detection circuit 21 to be the sensor detection signal, which is compared with the target value 22. That is, the target value 22 defines a target value of the amplitude of the stylus 131 (hereinafter referred to as target amplitude), and the amplitude of the stylus 131 is controlled so as to be equal to the target amplitude in measurement.

More specifically, when the amplitude of the stylus 131 becomes smaller than the target amplitude, the sensor 13 is moved in +Z-axis direction by contracting the actuator 11 to decrease the measurement load applied to the stylus 131, so that the amplitude is increased to the target amplitude. In contrast, when the amplitude of the stylus 131 becomes greater than the target amplitude, the sensor 13 is moved in −Z-axis direction by extending the actuator 11 to increase the measurement load applied to the stylus 131, so that the amplitude is attenuated to the target amplitude.

As described above, the amplitude of the stylus 131 is equalized with the target amplitude under the feedback control of the closed loop L. The amplitude of the stylus 131 being constant indicates that the vertical distance (in Z-axis direction) between the sensor 13 and the workpiece W is constant. Thus, when the body 1 is scanned in X-Y direction in this state, the sensor 13 is displaced in Z-axis direction along surface irregularity of the workpiece W by actuation of the actuator 11. By sensing the displacement in Z-axis direction using a suitable displacement sensor, the surface irregularity of the workpiece W can be sensed, which allows a scanning measurement of the surface of the workpiece W.

Although the scanning measurement is exemplified in the above description, a touch measurement of the workpiece can also be conducted with the measuring instrument of the present embodiment.

The body 1 is moved in −Z-axis direction with the actuator 11 being fixed in, for example, maximum extension state to bring the body 1 closer to the workpiece W until the amplitude of the stylus 131 is attenuated to the target amplitude due to the measurement load from the workpiece W. When the amplitude of the stylus 131 is equalized with the target amplitude, the movement of the body 1 in −Z-axis direction is stopped. A three dimensional coordinate (X, Y, Z) of the body 1 at this time is sensed by a not-shown three dimensional displacement sensor (touch measurement). By conducting the measurement at each measurement point on the workpiece W, a form measurement of the workpiece W can be conducted.

The touch measurement can also be conducted by extending/contracting the actuator 11 with the position of the body 1 in Z-axis direction being fixed. In other words, contact state between the stylus 131 and the workpiece W is adjusted by controlling extension/contraction of the actuator 11. When the amplitude of the stylus 131 is equalized with the target amplitude, the extension/contraction of the actuator 11 is stopped. An extension amount (in Z-axis direction) of the actuator 11 and X-Y coordinate of the body 1 at this time are sensed (touch measurement). By conducting the measurement at each measurement point on the workpiece W, a form measurement of the workpiece W can be conducted.

In the scanning measurement and the touch measurement described above as examples of measurement using the measuring instrument of the present embodiment, the feedback control by the closed loop L needs to be performed appropriately to conduct these measurements appropriately. Unstable control state generates the hunting in the closed loop L, which causes the output value of the sensor detection signal from the sensor detection circuit 21 to greatly oscillate around the target value 22. This means that the amplitude of the stylus 131 oscillates around the target amplitude with considerably great amplitude. Since both the scanning measurement and the touch measurement described above assume that the amplitude of the stylus 131 can be equalized with the target amplitude, generation of the hunting impedes the measurement from being conducted appropriately, thus considerably degrading measurement precision.

In order to prevent generation of the hunting to appropriately perform the feedback control by the closed loop L, a gain G of the closed loop L has to be adjusted to an optimal value. Now, as shown in FIG. 3, when gains of the control circuit 23, the drive circuit 24, the actuator 11 or the driver 1A, the sensor 13 and the sensor detection circuit 21 are respectively indicated as $G_C$, $G_{AD}$, $G_A$, $G_S$ and $G_{SD}$, the gain G of the entire closed loop L is represented by Equation 1 below.

$$G = \frac{1}{1 + \frac{1}{G_C G_{AD} G_A G_S G_{SD}}} \qquad \text{(Equation 1)}$$

In Equation 1, only the gain $G_C$ of the control circuit 23 can be adjusted by the control circuit gain adjuster 3. Thus, in order to optimize the gain G of the closed loop L and to conduct the measurement stably and precisely, the gain $G_C$ needs to be optimized. Setting of the $G_C$ will be described below.

The body 1 is moved in Z-axis direction with X-Y position of the body 1 being fixed, and stopped when the stylus 131 is pressed into the workpiece W by a predetermined amount. In the following description, X-Y-Z position of the body 1 is fixed at the stop position in the present step.

At this time, the feedback control by the closed loop L is not started, and the actuator 11 is fixed in a predetermined extension state, e.g., maximum extension state. Since both the body 1 and the actuator 11 are fixed, the contact load between the stylus 131 and the workpiece W is constant, and accordingly, the amplitude of the stylus 131 is also constant. In the following description, the constant amplitude (hereinafter, referred to as initial amplitude) is assumed to be smaller than a target amplitude defined by the target value 22. The following description can also be applied in general to a case where the initial amplitude is greater than the target amplitude.

From the above state, the feedback control of the closed loop L is started and a temporary measurement is conducted. The temporary measurement is conducted for each of N pieces of different gains $G_i$ (i=1, 2, 3, ..., N) that is sequentially and temporarily set in the control circuit 23 by the control circuit gain adjuster 3. More specifically, first, one gain is temporarily set to start the control, and a sensor detection signal output from the sensor detection circuit 21 at that time is imported into the control circuit gain adjuster 3 over a predetermined period of time. Then, the control is stopped, and after temporarily setting another gain, the control is restarted to import a sensor detection signal into the control circuit gain adjuster 3. Subsequently, the same operation is repeated until import of sensor detection signals for all of the N pieces of temporary gains $G_i$ is completed.

Figure 4:
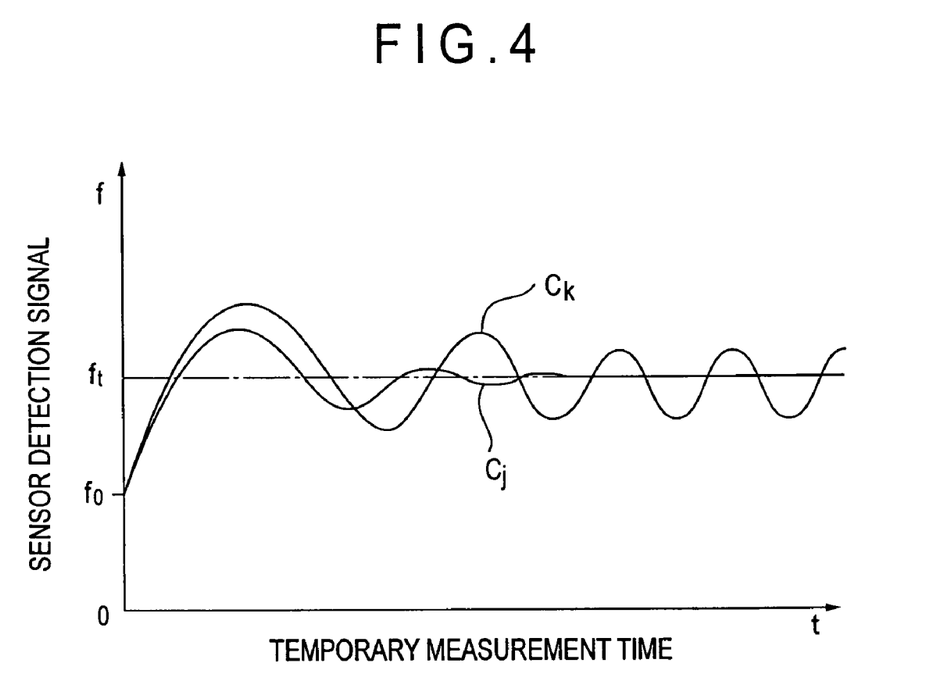
FIG. 4 is a graph showing a relationship between an output value of a sensor detection signal imported into a control circuit gain adjuster and a temporary measurement time in a temporary measurement using the measuring instrument of the embodiment.

FIG. 4 is a graph showing a relationship between an output value f of the sensor detection signal imported into the control circuit gain adjuster 3 and a temporary measurement time t. In FIG. 4, $C_j$ generally shows a curve in a case where the temporary gain of the control circuit 23 is appropriate, while $C_k$ generally shows a curve in a case where the temporary gain is not appropriate. Here, t=0 indicates a temporary measurement start point, namely, a point where the feedback control of the closed loop L is started for each of the temporary gains $G_i$. An $f_0$ indicates an output value of a sensor detection signal when the stylus 131 is in the initial amplitude before feedback control is started, while an $f_t$ indicates the target value 22 of the sensor detection signal. At the point of t=0, since the amplitude of the stylus 131 is constant (initial amplitude) regardless of the temporary gains $G_i$ of the control circuit 23, the output value of the sensor detection signal is also constant ($f_0$), so that start points of the $C_j$ and the $C_k$ are (0, $f_0$) in common.

In the $C_j$, since the temporary gain (hereinafter referred to as $G_j$) is appropriate, the sensor detection signal f comes approximate to a target value $f_t$. As shown in FIG. 4, the f and the $f_t$ are substantially equalized after a predetermined time is elapsed, which means that the temporary gain $G_j$ can keep the control state of the closed loop L stably, so that the measurement can be conducted stably and appropriately.

On the other hand, in the $C_k$, since the temporary gain (hereinafter referred to as $G_k$) is not appropriate, the hunting is generated and the sensor detection signal f keeps oscillating around the target value $f_t$. As shown in FIG. 4, the amplitude of the hunting hardly attenuates even after a predetermined time is elapsed, the f and the $f_t$ cannot be equalized steadily. As described above, the temporary gain $G_k$ causes the control state of the closed loop L to be unstable, so that the measurement cannot be conducted appropriately.

Figure 6:
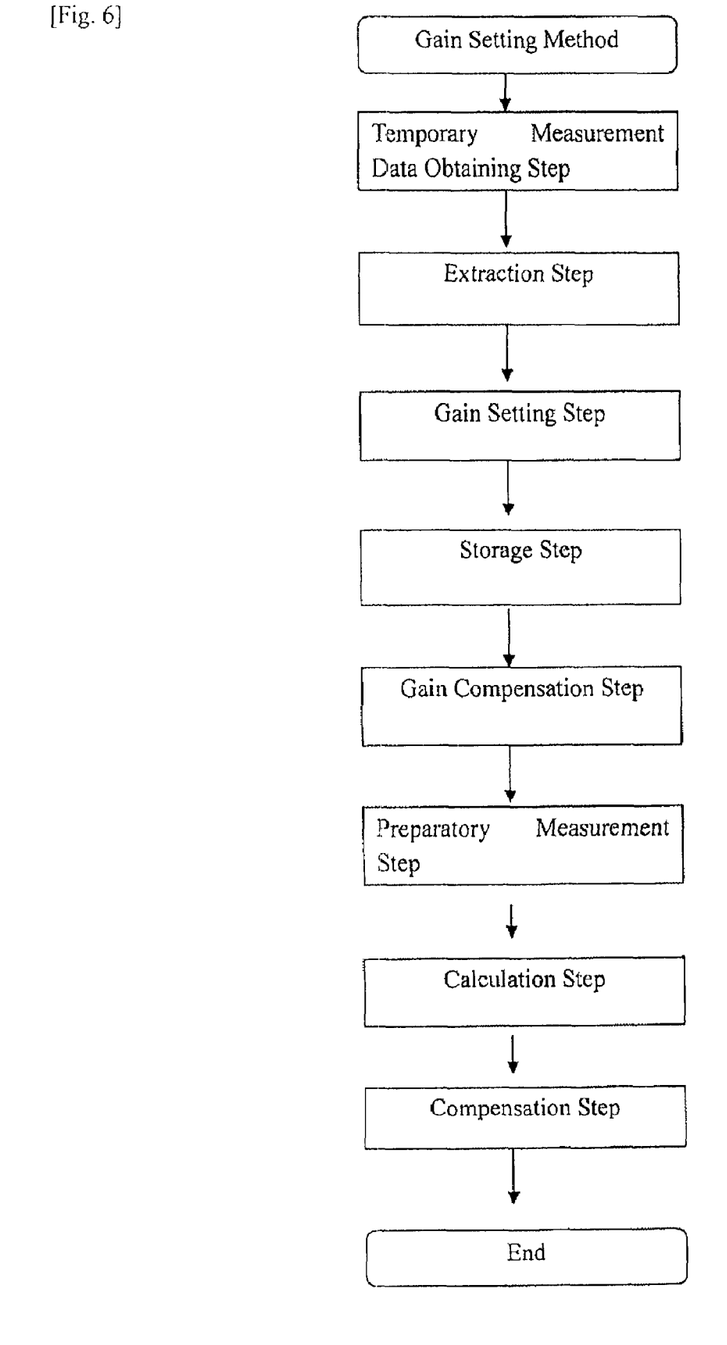
FIG. 6 is a flow chart showing a gain setting method in the embodiment.

According to the present embodiment, the gains $G_j$ (j=1, 2, ..., M) that does not generate the hunting (refer to the $C_j$) and the gains $G_k$ (k=1, 2, ..., N−M) that generates the hunting (refer to the $C_k$) can be identified from N pieces of different gains $G_i$ in the temporary measurement data obtaining step and the extraction step. Both of the steps will be described below with reference to FIG. 6.

[Temporary Measurement Data Obtaining Step]

The sensor detection signal for each of the temporary gains Gi, which is imported into the control circuit gain adjuster 3 over a predetermined time, is filtered by a frequency filter 31.

In the sensor detection signal indicated as waveform regarding time (FIG. 4), the filter 31 only allows a frequency component corresponding to frequency (oscillation frequency) generating the hunting to pass through. Thus, if the component having passed through the filter 31 is large, the hunting generated in the closed loop L is large, causing unstable control state. Although described later in detail, magnitude of the component having passed through the filter 31 is compared with a predetermined reference value, and it is determined that the hunting is generated with the magnitude of the component equal to or larger than the reference value, while it is determined that the hunting is not generated with the magnitude smaller than the reference value. A gain that satisfies predetermined requirements in the temporary gains $G_j$ providing data determined not to generate the hunting is set in the control circuit 23 as an optimal gain.

As described above, since the magnitude of the frequency component having passed through the filter 31 is a critical index in setting the optimal gain (largest frequency characteristics) that does not generate the hunting, it is necessary to set a passable frequency zone exactly in the filter 31 in order to allow only a desired frequency component to pass therethrough. In the following description, how to set the passable frequency zone will be described.

As described above referring to FIG. 1, the self-oscillation frequency zone in which the hunting is mainly generated is represented by $\omega_0=\omega=\omega_c$ using a phase crossover frequency $\omega_0$ and a gain crossover frequency $\omega_c$ of the entire closed loop L (limited in a relation of $\omega_0=\omega_c$). In the present embodiment, since adjustment of the gain of the closed loop L is focused, the phase is regarded as fixed. A lower limit $\bullet_0$ of the self-oscillation frequency zone is a common value for each of the temporary gains $G_i$. On the other hand, an upper limit $\omega_c$ of the self-oscillation frequency zone is a value different for each of the temporary gains $G_i$. As shown in FIG. 1, the larger a value of the gain is, the larger a value of the $\omega_c$ becomes, thereby the self-oscillation frequency zone is widened.

Meanwhile, the amplitude of the hunting of frequency that belongs to the self-oscillation frequency zone has a positive correlation with the magnitude of the gain (amplification factor) at the frequency. As shown in FIG. 1, since a gain of a control system is generally arranged to flatly attenuate relative to frequency, a gain around the lower limit ($\omega_0$) is larger than a gain around the upper limit ($\omega_c$) in the self-oscillation frequency zone. Thus, the amplitude of the hunting in the frequency that belongs to the self-oscillation frequency zone is large in a frequency zone around the lower limit $\omega_0$ (hereinafter referred to as main oscillation frequency zone) represented by $\omega_0=\omega=\omega_0+\Delta\omega(<\omega_c)$, which indicates that the hunting with the large amplitude is a main factor that causes the measurement control state to be unstable.

Therefore, the passable frequency zone of the filter 31 is set so as to be equalized with the main oscillation frequency zone. Since the filter 31 set as described above allows only a frequency component corresponding to main hunting to pass through, which can be analyzed, the optimal gain that does not generate the hunting can be easily determined. Note that an optimal value has been appropriately set in advance for a width $\Delta\omega$ of the passable frequency zone of the filter 31 that is set as described above.

An output value $S_i$ of the sensor detection signal for each of the temporary gains $G_i$ filtered by the filter 31 described above is stored in a memory 32 as temporary measurement data of the present invention based on the sensor detection signal as a measurement signal.

[Extraction Step]

Next, each of the $S_i$ is compared with a predetermined reference value $S_0$ having been set in advance. Since the reference value $S_0$ has been set in advance as an optimal value for determining presence of the hunting in the closed loop L, the temporary gain $G_k$ satisfying $S_k=S_0$ generates the hunting, while the temporary gain $G_j$ satisfying $S_j<S_0$ does not generate the hunting. In the extraction step, only the temporary gain $G_j$ (satisfying $S_j<S_0$) that does not generate the hunting is extracted and stored in a memory 33.

[Gain Setting Step]

In the subsequent gain setting step, a gain having the largest value in the extracted $G_j$ is selected to be set as a gain ($G_c$) of the control circuit 23. Herein, a reason for selecting the largest $G_j$ is to enhance the steady state and responsivity of the closed loop L, in other words, to maximize the frequency characteristics of the measurement control system.

As described above, according to the gain setting method of the present embodiment, stability of the closed loop L is secured by extracting the gains $G_j$ (j=1, 2, . . . , M (=N)) that does not generate the hunting, while high steady state and responsivity can be achieved by selecting the gain $G_j$ having the largest value in the gains $G_j$. Therefore, the measurement can be conducted stably, highly precisely and quickly.

[Storage Step]

In the following description, the gain set in the control circuit 23 as the optimal gain in the gain setting step described above is referred to as $G_c$. Also, the gain for the entire closed loop L at this time is referred to as G. The G is stored in a memory 41 of a control circuit gain compensator 4 as an optimal gain of the entire closed loop L.

[Gain Compensation Step]

Next, how the gain is compensated will be described below.

When at least one of the stylus 131 and the workpiece W is replaced with another one having different properties, a gain $G_s$ of the sensor 13 in FIG. 3 is apparently changed.

For instance, when a workpiece W made of soft material is replaced with one made of hard material, since measurement load applied to the stylus 131 from the workpiece W is increased, change rate of the amplitude of the stylus 131 relative to an input from the actuator 11 or the driver 1A (extension amount of the actuator 11 or moving amount in Z-axis direction of the driver 1A) is increased. Consequently change rate of the sensor signal from the sensor 13 is increased. This means that the gain Gs of the sensor 13 (which is the output value of the sensor signal divided by the output from the actuator or by the driver 1A) is apparently changed.

Herein, the gain of the sensor 13 which is apparently changed is referred to as $G_s'$, while a gain of the entire closed loop L calculated by substituting the $G_s'$ in Equation 1 is referred to as G'. Since G'≠G is established, the gain of the closed loop L at this time is deviated from the optimal gain, and if the measurement is conducted under the condition, disadvantages in stability, steady state and responsivity might occur. Then, the gain G' of the closed loop L is compensated to be the optimal gain G by counterbalancing the apparent change of the gain of the sensor 13. In the present embodiment, the optimal gain can be obtained by compensating the gain of the control circuit 23 in the control circuit gain compensator 4. More detailed description will be given below.

[Preparatory Measurement Step]

After at least one of the stylus 131 and the workpiece W is replaced, the body 1 is moved in Z-axis direction with X-Y coordinate of the body 1 being fixed to press the stylus 131 into one point of the workpiece W to conduct a contact measurement. The vertical distance between the displacement sensor 14 and the workpiece W (in the Z-axis direction) is changed, and a displacement signal according to the change rate (pressing amount) is output from the displacement sensor 14. The displacement signal is input to an arithmetic circuit 42 of the control circuit gain compensator 4 along with the sensor signal from the sensor 13.

[Calculation Step]

The arithmetic circuit 42 calculates the gain $G_s'$ of the sensor 13, which has been apparently changed based on the two signals.

Figure 5:
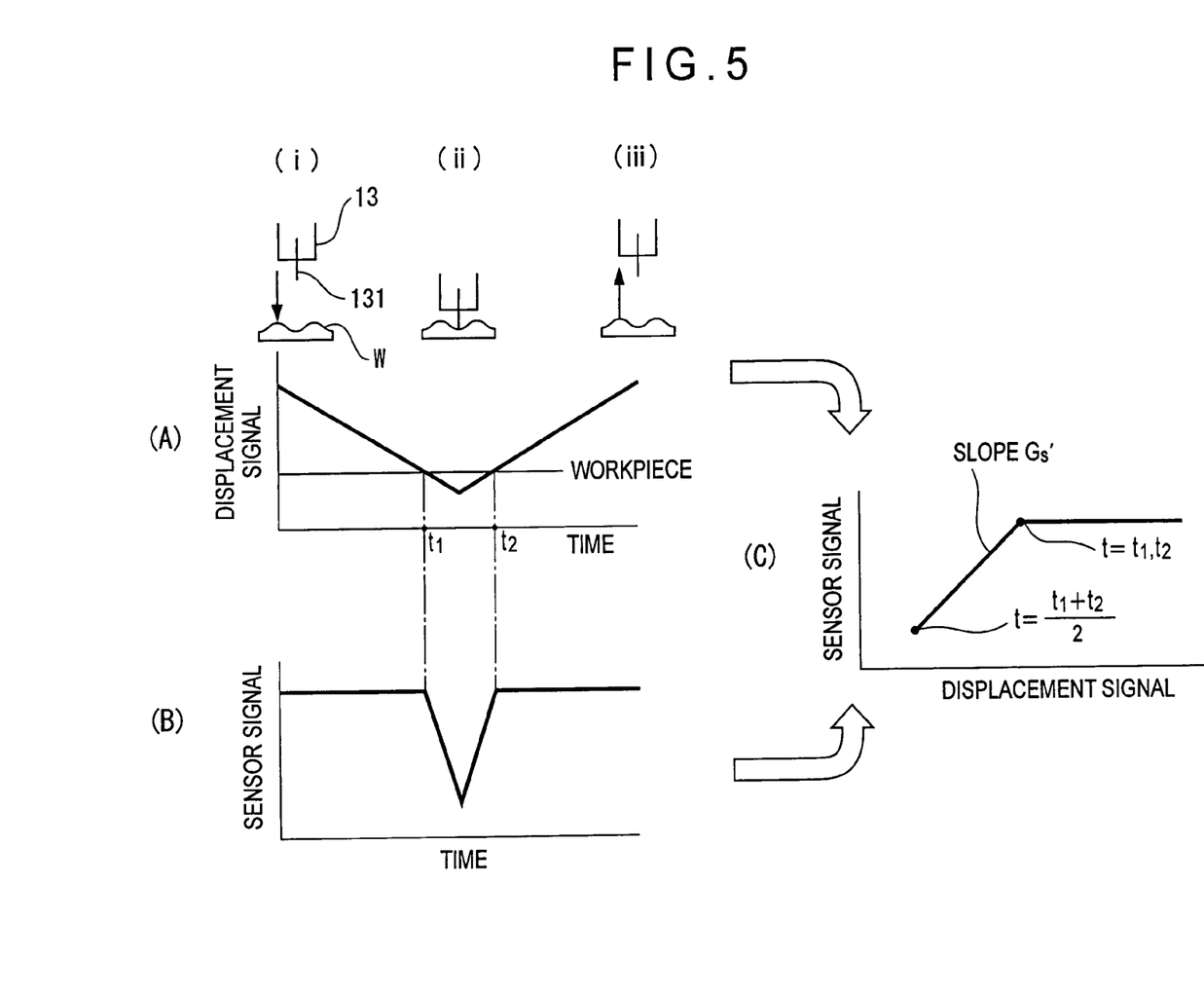
FIG. 5 is an illustration showing how an apparent change of a gain in a sensor is calculated using a displacement signal and a sensor signal in the embodiment.

Calculation of the $G_s'$ is performed, for instance, as shown in FIG. 5. Sections (A) and (B) in FIG. 5 are graphs respectively showing a relationship between time and a displacement signal and a relationship between time and a sensor signal, where (i) the sensor 13 (body 1) is moved closer to the workpiece W at a constant speed, (ii) the stylus 131 is pressed into the workpiece W by a predetermined amount, and then (iii) the sensor 13 is moved away from the workpiece W at the same speed, while a section (C) in FIG. 5 is a graph showing a relationship between the displacement signal and the sensor signal based on the sections (A) and (B).

A time domain of t1=t=t2 in the sections (A) and (B) of FIG. 5, the stylus 131 and the workpiece W are in contact, and the sensor signal changes in accordance with the pressing amount of the stylus 131, which is represented by a line having a predetermined slope in the section (C). By appropriately obtaining an origin of coordinate in the section (C), an extension of the line can pass through the origin, a slope of which can be represented by the sensor signal divided by the displacement signal. Here, since the displacement signal corresponds to an input from the driver 1A to the sensor 13 (movement of the body 1 in Z-axis direction), the slope is obtained when the output from sensor 13 is divided by the input to sensor 13, which is equalized with the gain $G_s'$ for the sensor 13.

Further, when the calculated $G_s'$ is substituted to right-hand side of Equation 1, the arithmetic circuit 42 calculates a value of a gain $G_c'$ of the control circuit 23 so that left-hand side of Equation 1 is kept to the optimal gain G (stored in the memory 41) of the closed loop L. Specifically, a compensation gain $G_c'$ of the control circuit 23 is calculated as a unique value that satisfies below-described Equation 2 including the $G_s'$ and the optimal gain G.

$$G = \frac{1}{1 + \frac{1}{G_C' G_{AD} G_A G_S' G_{SD}}}$$ [Compensation Step]

The control circuit gain compensator 4 sets the $G_c'$ calculated as described above in the control circuit 23. With the arrangement, even when at least one of the stylus 131 and the workpiece W is replaced with another one having different properties, the gain of the entire closed loop L can be kept to the optimal gain G, thereby maintaining high stability, steady state and responsivity of the measurement.

Incidentally, the present invention is not limited to the above-described embodiment, but includes modifications and improvements as long as the objects of the present invention can be achieved.

Although the main oscillation frequency zone ($\omega_0=\omega=\omega_0+\Delta\omega$) which is common to each of the temporary gains $G_i$ is set as the passable frequency zone of the filter 31 in the above-described embodiment, N pieces of different passable frequency zones may be set for each of the temporary gains $G_i$ in the present invention. For instance, by employing the self-oscillation frequency zone ($\omega_0=\omega=\omega_c$) set for each of the temporary gains $G_i$ as a passable frequency zone for each of the temporary gains $G_i$, a gain appropriately preventing generation of the hunting can be set in the control circuit 23. Switching between each of N pieces of the passable frequency zones may be performed by adjusting a passable frequency zone of one filter, or by preparing N pieces of filters each having passable frequency zone equal to a self-oscillation frequency zone of each of the temporary setting gains $G_i$ and switching the filters to be used in accordance with a gain that is set temporarily.

Although the passable frequency zone ($\omega_0 = \omega = \omega_0 + \Delta\omega$) of the filter 31 is set only by focusing on the self-oscillation frequency zone ($\omega_0 = \omega = \omega_c$) defined previously in the above-described embodiment, if there is a frequency (or a frequency zone) that generates the hunting in the closed loop L in addition to the self-oscillation frequency zone, the passable frequency zone of the filter 31 may be so set as to involve that frequency (or frequency zone).

For instance, a filter 31 that uses resonance frequency $\omega_r$ of an electric circuit of the closed loop L as a passable frequency zone in addition to the frequency that belongs to the self-oscillation frequency zone may also be employed. When the $\omega_r$ differs for each of the temporary gains $G_i$, a frequency component corresponding to each of the $\omega_r$ can be filtered and taken out by adjusting a passable frequency of one filter, or by preparing N pieces of filters each having a passable frequency zone equal to each of the $\omega_r$ and switching the filters in accordance with each of the $G_i$.

Although compensation of the gain using the sensor 13 having the stylus 131 as the measuring unit is described in the above-described embodiment, the gain compensation method according to the embodiment may also be applied to an arrangement including a non-contact probe as a measuring unit described above.

For instance, when an optical probe that receives a reflective light from a workpiece to which the light is irradiated for measurement is employed as the non-contact probe, an amount of light receive by the optical prove changes depending on optical properties such as reflectivity of the workpieces, which causes changes in measurement signals output from the optical probe. Thus, when the workpiece is replaced with another one having different optical properties, a gain of the optical probe is apparently changed, that causes the gain of the closed loop for feedback control might be deviated from the optimal gain. With the present invention, the apparent change in the gain of the optical probe can be calculated based on, for instance, a change in the amount of the light received by the optical prove due to the replacement of the workpiece, and further, a gain of the control circuit, which can keep the gain of the entire closed loop to the optimal gain, can be calculated and set. Thus, regardless of types of the workpiece, high stability, steady state and responsivity of the measurement can be maintained.

Although the sensor detection signal in the temporary measurement is filtered by the filter 31 in the above-described embodiment, the filter is not necessarily provided in the present invention, and the optimal gain may be determined by conducting a direct frequency analysis for the sensor detection signal. Specifically, the sensor detection signal is Fourier-transformed to be indicated as frequency, and only a frequency component corresponding to the oscillation frequency is extracted therefrom to be compared with a predetermined reference value. When the oscillation frequency component is smaller than the reference value, it is determined that the hunting is not generated in the closed loop, so that, by setting the temporary gain at this time in the control circuit, the measurement can be conducted stably.

Although a so-called oscillation probe having the stylus 131 that is constantly oscillated as the measuring unit in the above described embodiment, various probes of either contact type or non-contact type may be employed in the present invention. For instance, an optical sensor or an interferometer using CCD, an electro static capacitance sensor, an electromagnetic induction sensor, an acoustic sensor using ultrasonic wave, a hinged probe having a strain gauge, etc. may be employed.

Although the body 1 is moved in Z-axis direction and the gain $G_s'$ of the sensor 13 is calculated using the displacement signal in the preparatory measurement step and the calculation step of the above-described embodiment, in the present invention, the actuator 11 may be extended or contracted to move the sensor 13 in Z-axis direction instead of moving the body 1 in Z-axis direction and the $G_s'$ may be calculated using the extension amount of the actuator 11 and the sensor signal from the sensor 13.

Although setting of the gain in the control circuit gain adjuster 3 and compensation of the gain in the control circuit gain compensator 4 are combined in the above-described embodiment, they are not necessarily combined in the present invention and may be used separately. Especially, when the control circuit gain compensator 4 is used separately, the optimal gain of the measurement control system (closed loop) is calculated in advance in some way, and when at least one of the measuring unit and the workpiece is replaced and the gain of the measuring unit is changed, the gain of the control circuit 23 may be compensated using the control circuit gain compensator 4 so that the gain of the entire control measurement can be kept to the above-described optimal gain.

Although the above-described embodiment exemplifies a case where only the gain G of the control circuit 23 is changeable as the control parameter Q, there may also be employed an arrangement where a phase compensation circuit is provided to the control circuit 23 with phase characteristics PH of the phase compensation circuit being changeable so that phase crossover frequency $\omega_0$ becomes of the closed loop L changeable. For instance, by employing a phase lead compensation circuit as the phase compensation circuit, frequency characteristics of the measurement control system can further be enhanced. In addition, by employing a phase delay compensation circuit as the phase compensation circuit, for instance, damaging phase fluctuation around the phase crossover frequency coo can be decreased, thereby enhancing stability of the measurement control system.

The priority applications Numbers JP2004-268753 and JP2004-268752 upon which this patent application is based are hereby incorporated by reference.

What is claimer is:

1. A control parameter setting method for a control circuit in a measurement control system including: a measuring unit used in measurement of a workpiece and outputting a measurement signal; a control circuit for outputting a control signal based on a deviation of an output value of the measurement signal from a predetermined target value; a controller for controlling the measuring unit based on the control signal so that the output value of the measurement signal is equalized with the target value, the method comprising:

a temporary measurement data obtaining step for conducting a temporary measurement by sequentially and temporarily setting a control parameter of the control circuit to N pieces of different control parameters $Q_i$ (i=1, 2, ..., N) to obtain temporary measurement data $S_i$ based on the measurement signal output during the temporary measurement over a predetermined time;

an extraction step for performing frequency analysis for each of the obtained temporary measurement data $S_i$ to extract temporary measurement data $S_i$ in which a magnitude of a frequency component corresponding to a predetermined oscillation frequency in the measurement control system is smaller than a predetermined reference value; and a control parameter setting step for setting a control parameter $Q_i$ having the largest frequency characteristics in the control parameters $Q_i$ respectively corresponding to the extracted temporary measurement data $S_i$ as the control parameter of the control circuit.

2. The control parameter setting method for the control circuit according to claim 1, wherein the control parameter of the control circuit is at least one of a gain or a phase compensation frequency.

3. The control parameter setting method for the control circuit according to claim 1, wherein in the temporary measurement data obtaining step for the control parameters $Q_i$, the temporary measurement data $S_i$ is obtained by filtering the measurement signal by a frequency filter that allows only a frequency component corresponding to the oscillation frequency to pass through.

4. The control parameter setting method for the control circuit according to claim 1, further comprising:

a storage step for storing a control parameter Q of the entire measurement control system determined by the control parameter $Q_i$ set in the control circuit in the control parameter setting step; and a control parameter compensation step for compensating the control parameter of the control circuit so as to counterbalance an apparent change of a control parameter of the measuring unit, the apparent change generated by replacing at least one of the measuring unit and the workpiece with another one having different properties, to keep the control parameter of the entire measurement control system to the stored control parameter Q.

5. The control parameter setting method for the control circuit according to claim 4, wherein the measuring unit is a probe that is brought in contact with the workpiece for measurement, and the control parameter compensation step includes:

a preparatory measurement step for conducting contact measurement by pressing the probe into the workpiece by a predetermined pressing amount after replacing at least one of the probe and the workpiece and measuring the pressing amount;

a calculation step for calculating the apparent change in the control parameter of the probe based on a relationship between the output value of the measurement signal and the measured pressing amount in the preparatory measurement step; and a compensation step for compensating the control parameter of the control circuit so that the control parameter of the entire measurement control system is kept to the control parameter Q based on a calculation result in the calculation step.

6. A control parameter setting method for a control circuit in a measurement control system including: a measuring unit used in measurement of a workpiece and outputting a measurement signal; a control circuit for outputting a control signal based on a deviation of an output value of the measurement signal from a predetermined target value; a controller for controlling the measuring unit based on the control signal so that the output value of the measurement signal is equalized with the target value, the method comprising:

a storage step for storing a control parameter Q providing the largest frequency characteristics in the measurement control system;

a control parameter compensation step for compensating the control parameter of the control circuit so as to counterbalance an apparent change of a control parameter of the measuring unit, the apparent change generated by replacing at least one of the measuring unit and the workpiece with another one having different properties, to keep the control parameter of the entire measurement control system to the stored control parameter Q.

7. The control parameter setting method for the control circuit according to claim 6, wherein the measuring unit is a probe that is brought in contact with the workpiece for measurement; and the control parameter compensation step includes:

a preparatory measurement step for conducting contact measurement by pressing the probe into the workpiece by a predetermined pressing amount after replacing at least one of the probe and the workpiece and measuring the pressing amount;

a calculation step for calculating an apparent change in the control parameter of the probe based on a relationship between the output value of the measurement signal and the measured pressing amount in the preparatory measurement step; and a compensation step for compensating the control parameter of the control circuit so that the control parameter of the entire measurement control system is kept to the control parameter Q based on a calculation result in the calculation step.

8. The control parameter setting method for the control circuit according to claim 6, further comprising a temporary measurement data obtaining step for conducting a temporary measurement by sequentially and temporarily setting a control parameter of the control circuit to N pieces of different control parameters $Q_i$ (i=1, 2, ..., N) to obtain temporary measurement data $S_i$ based on the measurement signal output during the temporary measurement over a predetermined time;

an extraction step for performing frequency analysis for each of the obtained temporary measurement data $S_i$ to extract temporary measurement data $S_i$ in which a magnitude of a frequency component corresponding to a predetermined oscillation frequency in the measurement control system is smaller than a predetermined reference value; and a control parameter setting step for setting a control parameter $Q_i$ having the largest frequency characteristics in the control parameters $Q_i$ respectively corresponding to the extracted temporary measurement data $S_i$ as the control parameter of the control circuit, wherein a control parameter Q of the entire measurement control system determined by the control parameter $Q_i$ set in the control circuit in the control parameter setting step is stored in the storage step.

9. The control parameter setting method for the control circuit according to claim 8, wherein in the temporary measurement data obtaining step for the control parameters $Q_i$, the temporary measurement data $S_i$ is obtained by filtering the measurement signal by a frequency filter that allows only a frequency component corresponding to the oscillation frequency to pass through.

10. The control parameter setting method for the control circuit according to claim 6, further comprising:

the control parameter of the control circuit is at least one of a gain or a phase compensation frequency.

* * * * *